(12) United States Patent
Wu et al.

(10) Patent No.: US 9,175,970 B2
(45) Date of Patent: Nov. 3, 2015

(54) ONLINE OPTIMAL REFUELING MANAGEMENT

(71) Applicant: Cummins Inc., Columbus, IN (US)

(72) Inventors: An Wu, Columbus, IN (US); Kenneth Follen, Greenwood, IN (US); Howard Robert Frost, Columbus, IN (US); Suk-Min Moon, Greenwood, IN (US); Vivek A. Sujan, Columbus, IN (US); Phani Vajapeyazula, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 13/958,400

(22) Filed: Aug. 2, 2013

(65) Prior Publication Data

US 2015/0039215 A1    Feb. 5, 2015

(51) Int. Cl.
| | |
|---|---|
| *G06F 19/00* | (2011.01) |
| *G06Q 30/00* | (2012.01) |
| *G01C 21/34* | (2006.01) |
| *B67D 7/04* | (2010.01) |
| *B67D 7/30* | (2010.01) |
| *B67D 7/22* | (2010.01) |
| *G07C 5/08* | (2006.01) |

(52) U.S. Cl.
CPC .............. *G01C 21/3469* (2013.01); *B67D 7/04* (2013.01); *B67D 7/221* (2013.01); *B67D 7/302* (2013.01); *G07C 5/0808* (2013.01)

(58) Field of Classification Search
USPC ........................................ 701/123; 705/26.3
See application file for complete search history.

(56) References Cited

U.S. PATENT DOCUMENTS

| 5,107,815 A * | 4/1992 | Van Duyne .................... 123/435 |
|---|---|---|
| 6,553,301 B1 | 4/2003 | Chhaya et al. |
| 7,899,584 B2 | 3/2011 | Schricker |
| 8,417,448 B1 * | 4/2013 | Denise .......................... 701/410 |
| 2007/0262855 A1 * | 11/2007 | Zuta et al. ..................... 340/439 |
| 2009/0109022 A1 * | 4/2009 | Gangopadhyay et al. .... 340/540 |
| 2009/0265099 A1 * | 10/2009 | Gottlieb ......................... 701/208 |
| 2011/0257869 A1 | 10/2011 | Kumar et al. |
| 2011/0301806 A1 * | 12/2011 | Messier et al. .................. 701/33 |
| 2012/0078496 A1 * | 3/2012 | Lindhuber et al. ............. 701/123 |
| 2013/0096818 A1 * | 4/2013 | Vicharelli et al. ............. 701/423 |
| 2013/0218427 A1 * | 8/2013 | Mukhopadhyay et al. ..... 701/51 |
| 2014/0172253 A1 * | 6/2014 | Palmer et al. ................... 701/56 |

FOREIGN PATENT DOCUMENTS

| EP | 1595789 | 11/2005 |
|---|---|---|
| WO | WO2009099797 | 8/2009 |

* cited by examiner

*Primary Examiner* — Thomas G Black
*Assistant Examiner* — Tyler Paige
(74) *Attorney, Agent, or Firm* — Foley & Lardner LLP

(57) ABSTRACT

A method and system for remotely determining real-time operating fuel efficiencies based on dynamic operating characteristics of a vehicle to generate an optimal refueling management approach for the vehicle by providing refueling locations and associated refueling amounts for each refueling location, to achieve improved vehicle fuel economy, is provided.

20 Claims, 7 Drawing Sheets

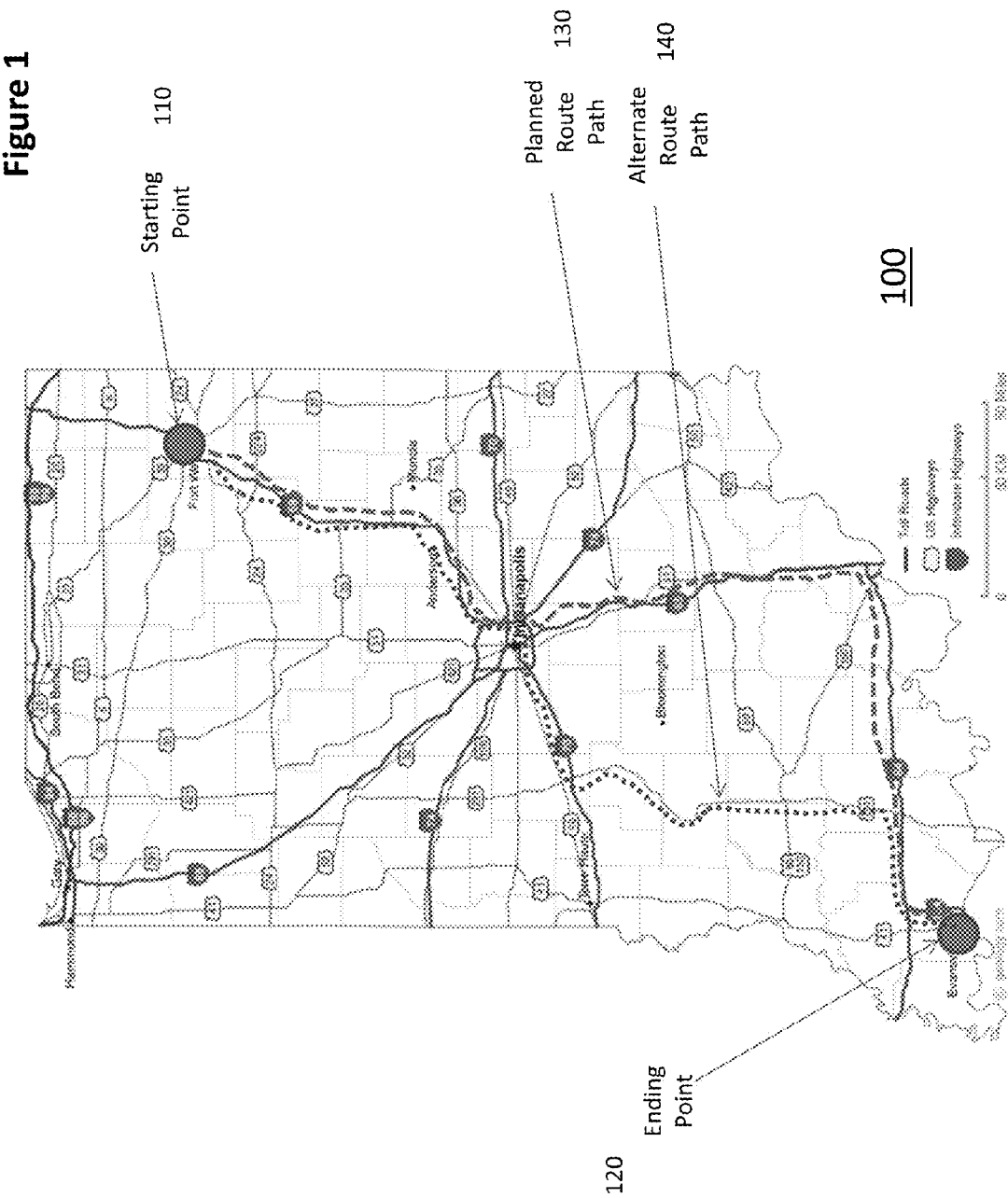

Initial Vehicle Parameters
210

- Initial Quantity of Fuel
- Initial fuel tank capacity
- Minimum fuel capacity,
- Mass of load
- Mass of vehicle
- Mass of personnel associated with vehicle
- Engine parameters and performance
- Engine fueling map
- Average estimated fuel economy
- Truck Weight
- GVWR

Route Parameters
220

- Starting Point
- Ending Point
- Estimated Average Fuel Efficiency
- Distance to be Traveled
- Distance Between Predetermined Points
- Route efficiency factor as b/n 2 predetermined points on a route path
- Topography details,
- Planned route path
- One or more alternate route paths
- Traffic conditions, Construction conditions, Wind information
- Weather conditions,
- Sensed data from one or more sensors resident on the vehicle or from one or more remote sensors in communication with the vehicle.

Refueling Parameters
230

- One or More Refueling Locations
- Reference Point as function of time
- Estimated Average Fuel Efficiency (calculated as the average estimated fuel economy multiplied by a route efficiency factor related to the route path as b/n 2 points along the planned route path).
- Type of refueling location
- Distance between refueling locations
- Refueling history of vehicle
- Preferred refueling conditions

Current Vehicle Parameters f(t)
240

- Vehicle location
- Quantity of fuel remaining
- Remaining capacity for fuel for vehicle
- Travel time since start
- Remaining travel time to end
- Estimated time to minimum fuel capacity
- Estimated miles to minimum fuel capacity
- Average vehicle speed
- Average engine performance
- Estimated time of arrival (ETA).

Refueling Agenda
250

- Determine and Identify One or More Refueling Locations
- Calculate and Identify Amount to be refueled at each refueling location

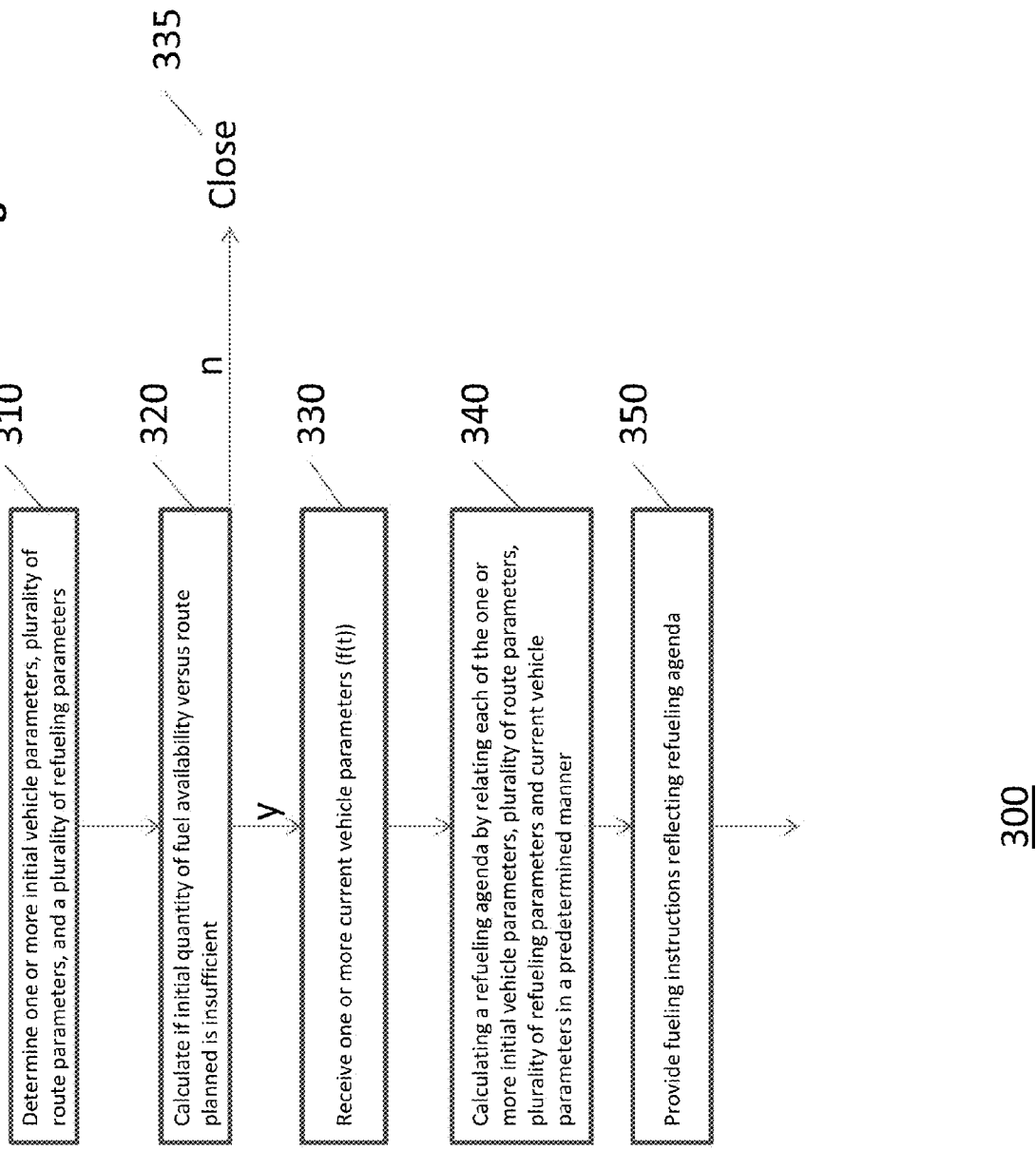

700

ONLINE OPTIMAL REFUELING MANAGEMENT

FIELD OF THE INVENTION

A system and method in accordance with the present invention relates generally to fuel efficiency processes, and more particularly to an optimal online refueling management approach.

BACKGROUND

Various techniques have been undertaken to determine approaches involving refueling strategies and efficiencies for a variety of vehicles. An issue that may often arise with these techniques is the failure to account for important operational characteristics which can detrimentally affect the efficiency of the approach. For instance, for compliant operation, the total weight of certain regulated vehicles cannot exceed a prescribed on-highway weight which reflects a maximum load, a maximum fuel quantity and a fixed weight for the vehicle. As a vehicle travels with its load, the fuel quantity diminishes with respect to the fuel economy and distance traveled, while the load may or may not also be modified due to contents, where the truck weight (excluding fuel and freight) remains fixed. Similarly, as the fuel diminishes it is often a challenge to determine an approach to optimally refuel the vehicle while minimizing operational impacts as it may be advantageous to have lesser fuel than the maximum allowable amount in exchange to have more freight content. With such a requirement and such dynamic characteristics of operation, determining an accurate and effective refueling methodology is desired.

For instance, U.S. Pat. No. 6,553,301, to Chhaya et al, provides for a fueling approach for hybrid-style automobiles involving accumulating torque data over a prescribed period time while considering driver habit to automatically adjust the operation of a vehicle's power train based in relation to driving habits of a particular driver. More particularly, the approach "learns" a driver's habit through the accumulation of driver torque request which is then used to influence the behavior of a second driver, leading to improved efficiency goals.

U.S. Pat. No. 7,899,584, to Schricker, provides for an off-board approach involving determining a control parameter of a vehicle in relation to an operation characteristic associated with the vehicle's operation before operating the vehicle on an assigned route.

Unfortunately, each of these approaches lacks real-time, online analysis associating current circumstances and the active operation, is unable to provide remote analysis and updates, does not include real-time learning of efficiencies or account for fueling station locations, and does not manage in real-time fuel mass or provide for management efficiencies of available fuel quantities for a target vehicle during the operation.

U.S. Pat. No. 6,691,025 to Reimer provides for a system for monitoring fuel consumption and optimizing refueling of a vehicle using a mounted fuel sensor that generates a distance measurement signal indicating the distance between the sensor and the surface of the fuel in the fuel tank. A driver may then receive a message from a network-connected dispatcher identifying refueling and route information. The approach is limited for reasons similar to those discussed above and additionally as it attempts to adjust for fuel consumption as a function of trip length and vehicle weight.

Published U.S. Patent Application 20110257869A1 to Kumar, et al., provides for a multi-mode engine having relatively different fuel ratios for each mode, where a controller changes the mode of engine from one operating mode to another operating mode and ratios are adjusted in accordance. The approach provides for a first operating mode in which the engine is configured to operate with a first ratio of a first fuel to a second fuel, etc. The approach is limited for reasons similar to those discussed above and additionally as it requires multiple fuel sources to be situated in particular ratios for multi-modes of an engine to determine efficiencies.

It is therefore desired to provide a method and system for remotely determining real-time operating fuel efficiencies based on dynamic operating characteristics of a vehicle to generate an optimal refueling management approach for the vehicle which provides refueling locations and associated refueling amounts, to achieve improved vehicle fuel economy.

SUMMARY

A system and method in accordance with the present invention fulfills these needs and has been developed in response to the present state of the art, and in particular, in response to the problems and needs in the art that have not yet been fully solved by currently available technologies.

A system and method in accordance with the present invention, in accordance with one or more embodiments, provides for a method for remotely providing refueling management instructions for a vehicle. The method includes the steps of determining one or more initial vehicle parameters including an initial quantity of fuel, a plurality of route parameters including a starting point, an ending point and an estimated average fuel efficiency of the vehicle, and a plurality of refueling parameters including one or more refueling locations; calculating that the initial quantity of fuel is insufficient in relation to the estimated average fuel efficiency and a distance to be traveled by the vehicle equal to a difference between the ending point and the starting point; and receiving one or more current vehicle parameters at a first predetermined time. The method also performs the step of calculating a refueling agenda including identifying one or more refueling locations and an associated predetermined refueling amount at each of the identified one or more refueling locations, to provide optimal fuel economy for the vehicle arriving at the ending point.

In another embodiment, a system and method in accordance with the present invention provides for a calculation system for determining an optimal refueling route for a vehicle requiring one or more refueling activities. The method also provides for identifying one or more initial vehicle parameters including an initial quantity of fuel, a plurality of route parameters including a starting point, an ending point and an estimated average fuel efficiency of the vehicle, and a plurality of refueling parameters including one or more refueling locations; receiving one or more sensed current vehicle parameters at a first predetermined time in relation to a first route location being a determinable distance from the end point; and providing in response to determinative calculations, refueling instructions including a refueling agenda identifying one or more refueling locations and an associated predetermined refueling amount at each of the one or more identified refueling locations.

In a further embodiment, a system and method in accordance with the present invention provides for a computer readable medium containing program instructions for determining an optimal refueling route for a vehicle requiring one or more refueling activities. A system and method in accordance with the present invention includes the program instructions for identifying one or more initial vehicle parameters including an initial quantity of fuel, a plurality of route parameters including a starting point, an ending point and an estimated average fuel efficiency of the vehicle, and a plurality of refueling parameters including one or more refueling locations; receiving one or more current vehicle parameters at a first predetermined time in relation to a first route location; and generating in response to predetermined calculations, refueling instructions including a refueling agenda identifying one or more refueling locations and an associated predetermined refueling amount at each of the one or more identified refueling locations.

While exemplary embodiments in accordance with the invention are illustrated and disclosed, such disclosure should not be construed as limiting. It is anticipated that various modifications and alternative designs may be made without departing from the scope of the invention.

BRIEF DESCRIPTION OF THE DRAWINGS

FIG. 1 is a depiction of a planned route for a vehicle having a starting point and an ending point, in accordance with an embodiment of the invention;

FIG. 2 is an exemplary listing of parameter and characteristics associated with the calculations of a system and method in accordance with the present invention, for determining a vehicle refueling strategy, in accordance with an embodiment of the invention;

FIG. 3 sets forth an exemplary logic process of determining a refueling strategy using a system and method in accordance with the present invention, in accordance with one or more embodiments;

DETAILED DESCRIPTION

Figure 4:
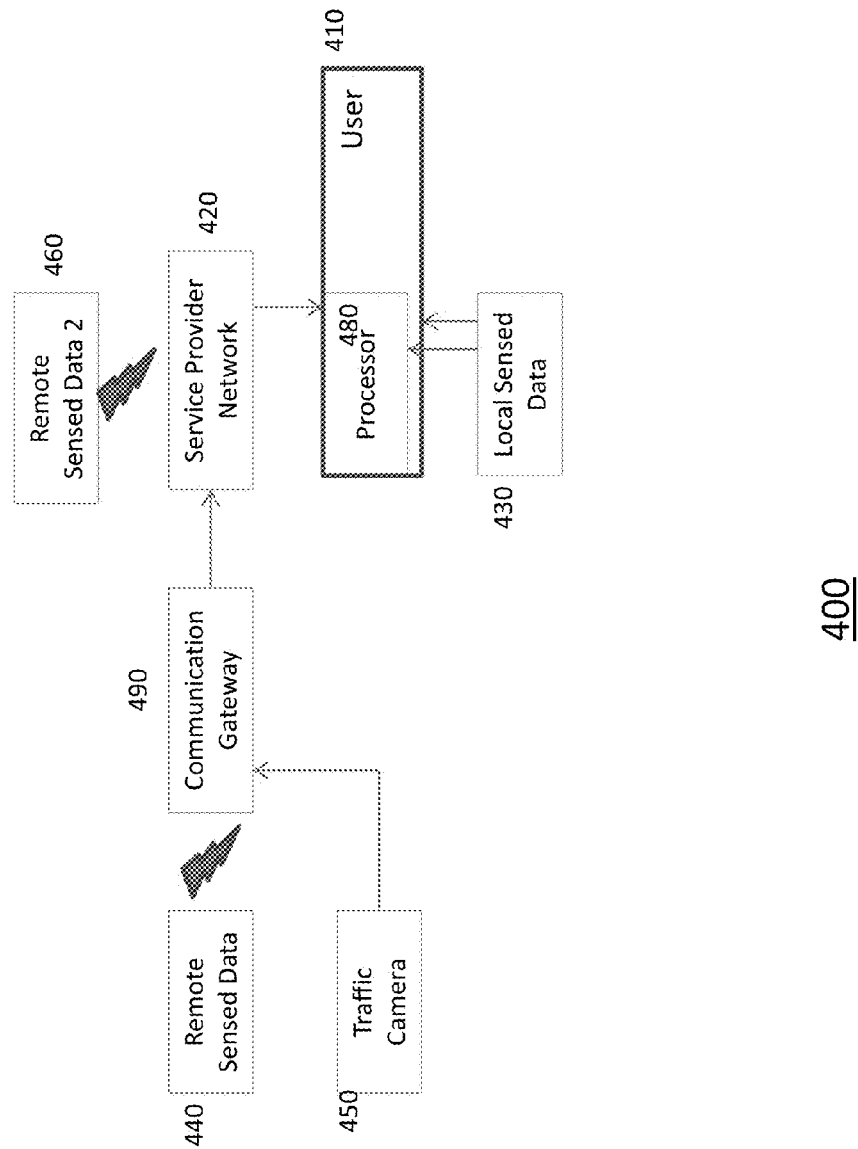
FIG. 4 depicts a block diagram of sensed data and communication of sensed data with the vehicle using a system and method in accordance with the present invention, in accordance with one or more embodiments.

Embodiments of the invention provide for determining an optimal online refueling management solution with improved fuel economy for a vehicle, which includes determining at least one refueling location and a calculated refueling amount associated with each identified refueling location, in relation to one or more initial vehicle parameters, route parameters, refueling parameters and current vehicle parameters at a first period. The identified refueling locations and refueling amounts for each location are determined in relation to the above parameters as well as refueling locations based on their geographical relation to the planned route. The invention also includes calculations for determining a refueling agenda including identifying one or more refueling locations and an associated predetermined refueling amount at each of the identified one or more refueling locations, to provide optimal fuel economy for the vehicle as it traverses from a starting point to a final ending point, where the fueling agenda may be communicated to the vehicle as instructions in any medium including physically, orally, audibly or electronically.

A system and method in accordance with the present invention provides a solution that can significantly improve freight efficiency and operations using a vehicle. It requires an understanding of the engine fueling maps along with vehicle and route parameters to optimize its refueling strategy in relation to the route path.

Operationally, a system and method in accordance with the present invention, in one or more embodiments, recognizes that the freight weight (load) and vehicle weight are generally fixed in that both amounts are of a known value as a vehicle's traverses its route or mission. For example, as between a starting point (SP) and an ending point (EP), a vehicle's gross weight will include the weight of the vehicle and the weight of the contents being shipped, as well as that of personnel associated with it. Typically, the weight of the contents being shipped will not deviate from SP to EP, unless the contents require removal, addition, refrigeration, cooling, or other environmental care. Distinctively, the weight of the vehicle will fluctuate primarily in relation to fuel on board (FOB) as a function of time with operation as between the SP and EP as fuel is being consumed and added during the trip.

Since the maximum available fuel quantity in the tank can be either equal to or less than the tank capacity, a maximum weight regarding the fuel can be determined. Where SP is an origination point for a mission and EP is a final destination point for a mission, there may be numerous sub-SPs and sub-EPs which may be sub-trips within the overall planned route where a vehicle is providing deliveries along the route such that the load contents are delivered or added to the vehicle, thereby further affecting its active gross weight in addition to the FOB considerations.

Since the freight weight (load), personnel weight, and vehicle weight, excluding fuel, are generally fixed and the amount of fuel present at a specific point in time can be determined using a system and method in accordance with the present invention as between a given SP and EP, the status and compliance of the vehicle's gross vehicle weight requirement (GVWR) can also be determined by a system and method in accordance with the present invention during the mission. An objective of a system and method in accordance with the present invention then is to improve fuel economy efficiencies of the vehicle's operation in relation to operational and vehicle characteristics by effectively managing the fuel quantity (and hence usage) by calculating and identifying optimal refueling locations and associated amounts to refuel (quantity) at each identified refueling location.

FIG. 1 is a depiction 100 of a planned route 130 for a vehicle having a starting point 110 and an ending point 120, in accordance with an embodiment of the invention. From FIG. 1, a vehicle's planned route is determined as between a SP 110 and an EP 120, where the optimal route 130 is calculated to accommodate for vehicle size, loads, deliveries, statutory restrictions, availability of refueling locations, etc. In one or more embodiments, alternate routes 140 may also be calculated in the event of construction, detour or other interruption to the planned route path 130. A system and method in accordance with the present invention determines whether the initial quantity of fuel in the vehicle is sufficient for the planned route, and if not, the invention then calculates a refueling strategy in relation to one or more initial vehicle parameters, a plurality of refueling parameters, a plurality of route parameters and one or more current vehicle parameters, in a predetermined relational manner. For instance, where the distance d between the SP and EP exceeds the estimated fuel efficiency of the vehicle in association with the initial fuel quantity (such that N (available fuel)<D (fuel need for distance)), a system and method in accordance with the present invention would undertake its calculation to determine a refueling strategy for the vehicle, in relation to the planned route path, including the calculation of n stops for refueling at specific locations.

FIG. 2 is an exemplary listing 200 of parameter and characteristics associated with the calculations of a system and method in accordance with the present invention, for determining a vehicle refueling strategy, in accordance with an embodiment of the invention. The specific parameters and characteristics identified in FIG. 2 are by example only and are not intended to be limiting; a system and method in accordance with the present invention may use the identified parameters and characteristics as well as others not so identified to perform the steps, calculations and relations identified herein.

From FIG. 2, the Initial Vehicle Parameters are set forth at 210. The Initial Vehicle Parameters may include but are not limited to one or more of: Initial Quantity of Fuel, Initial fuel tank capacity, Minimum fuel capacity, Mass of load, Mass of vehicle, Mass of personnel associated with vehicle, Engine parameters and performance, Engine fueling map, Average estimated fuel economy, Truck Weight, and GVWR.

From FIG. 2, the Route Parameters are set forth at 220. The Route Parameters may include but are not limited to one or more of: Starting Point, Ending Point, Estimated Average Fuel Efficiency, Distance to be Traveled, Distance Between Predetermined Points, Route efficiency factor as b/n 2 predetermined points on a route path, Topography details, Planned route path, One or more alternate route paths, Traffic conditions, Construction conditions, Wind information, Weather conditions, and Sensed data from one or more sensors resident on the vehicle or from one or more remote sensors in communication with the vehicle.

From FIG. 2, the Refueling Parameters are set forth at 230. The Refueling Parameters may include but are not limited to one or more of: One or More Refueling Locations, Reference Point as function of time, Estimated Average Fuel Efficiency (calculated as the average estimated fuel economy multiplied by a route efficiency factor related to the route path as b/n 2 points along the planned route path), Type of refueling location, Distance between refueling locations, Refueling history of vehicle, and Preferred refueling conditions.

From FIG. 2, the Current Vehicle Parameters as a function of time (f(t)) are set forth at 240. The Current Vehicle Parameters may include but are not limited to one or more of: Vehicle location, Quantity of fuel remaining, Remaining capacity for fuel for vehicle, Travel time since start, Remaining travel time to end, Estimated time to minimum fuel capacity, Estimated miles to minimum fuel capacity, Average vehicle speed, Average engine performance, and Estimated time of arrival (ETA).

From FIG. 2, the Refueling Agenda 250, once calculated, may determine and Identify One or More Refueling Locations and Calculate and Identify an Amount to be refueled at each refueling location. Further the refueling agenda may then be provided to the vehicle as a physical sheet, in verbal instructions, in an audible instruction set, or in an electronic communication that may involve computers, cell phones, or received electronic communications.

Additionally, a system and method in accordance with the present invention may also use route factors which are predetermined in relation to specifics of the route, vehicle, load or other factor influencing the vehicle's trip on the planned route. For instance, where there is planned construction as an inhibitor in the travels, a route factor may have a higher value to offset an estimated fuel economy where the route factor may be used to lower the planned fuel economy due to route conditions anticipated. In one or more embodiments, a system and method in accordance with the present invention will use route factors such as a Sacrificed Time Limit (E), a minimum fuel tank capacity requirement (m), a fuel consumed coefficient (b), and time spent refueling at each refueling location (t). It will be appreciated by those skilled in the art that a system and method in accordance with the present invention may have many variations to include a variety of route factors to more accurately determine an optimal refueling strategy for a vehicle.

FIG. 3 sets forth an exemplary logic process 300 of determining a refueling strategy using a system and method in accordance with the present invention, in accordance with one or more embodiments.

From FIG. 3, an embodiment for remotely providing refueling management instructions for a vehicle is provided 300. The embodiment includes the steps of determining one or more initial vehicle parameters, a plurality of route parameters and a plurality of refueling parameters 310. The approach then calculates whether the initial quantity of fuel is insufficient in relation to the estimated average fuel efficiency and a distance to be traveled by the vehicle equal to a difference between the ending point and the starting point at 320. If so, the approach then receives one or more current vehicle parameters at a first predetermined time at 330; if not, the approach is not utilized as there is no need to refuel the vehicle at the assessed time (t), at 335. The embodiment also performs the step of calculating a refueling agenda in a predetermined manner including identifying one or more refueling locations and an associated predetermined refueling amount at each of the identified one or more refueling locations, to provide optimal fuel economy for the vehicle arriving at the ending point, at 340. From 340, refueling instructions and details (such as refueling locations and amounts to refuel at ach refueling location) are set forth at 350.

In a preferred embodiment, the predetermined manner will include a logic relationship as between the identified parameters and characteristics in accordance with an associative calculation such as the following:

Energy affected by Fuel Load Management is:

$$E = \int \left( \frac{1}{2} C_d \rho A v^2 + C_{rr} mg \cos\theta + mg \sin\theta + ma \right) v dt$$

The air drag is deleted because no weight related.

Optimal Control:

$$\text{Target: } \min \int (C_{rr} mg \cos\theta + mg \sin\theta + ma) ds \text{ Constraints: } m_i > \underline{m}, t \leq \bar{t}$$

$$m = \begin{cases} M + m_0 - b_0 s, & 0 \leq s < s_1 \\ M + m_1 - b_1(s - s_1), & s_1 \leq s < s_2 \\ \vdots & \vdots \\ M + m_i - b_i(s - s_i), & s_i \leq s < s_{i+1} \\ \vdots & \vdots \\ M + m_n - b_n(s - s_n), & s_n \leq s \end{cases}$$

-continued $$t = \sum_{i=1}^{i=n} c_i$$

$S$ location of vehicle $S_i$ $i$th refueling location $M$ Mass of vehicle, freight and driver $m_i$ fuel quantity (mass) at $i$th refueling $b_i(m, \theta, v, a)$ fuel consumed coefficient $c_i(m_i, s)$ time spent at $i$th refueling $\underline{m}$ minimum fuel in tank $\bar{t}$ sacrificed time limit $n$ times to refuel Assume uphill and downhill do not affect the problem. ($\theta=0$)

Assume the vehicle has a constant velocity.

Energy affected by fuel management is:

$$E = \int \left(\frac{1}{2} C_d \rho A v^2 + C_n mg \cos\theta + mg \sin\theta + m a\right) v \, dt = C_n g \int m(s) ds$$

Optimal Control:

Target: $\min \int m(s) ds$   Constraints: $m_i > \underline{m}, t \leq \bar{t}$ $$\begin{cases} M + m_0 - bs, & 0 \leq s < s_1 \\ M + m_1 - b(s - s_1), & s_1 \leq s < s_2 \\ \vdots & \vdots \\ M + m_i - b(s - s_i), & s_i \leq s < s_{i+1} \\ \vdots & \vdots \\ M + m_{n-1} - b(s - s_{n-1}), & s_{n-1} \leq s \end{cases}$$

$t = c \cdot n$ $S$ location of vehicle $S_i$ $i$th refueling location $M$ Mass of vehicle, freight and driver and minimum fuel quantity (mass)

$m_0$ Initial fuel quantity-minimum fuel quantity (mass)

$m_i$ Adding fuel quantity (mass) at $i$th refueling $b$ fuel consumed coefficient $c$ time spent every refueling $\underline{m}$ minimum fuel in tank $\bar{t}$ sacrificed time limit $$\min \int m(s) ds =$$

$$\int_0^{s_1} (M + m_0 - bs) ds + \int_{s_1}^{s_2} (M + m_1 - b(s - s_1)) ds +$$

$$\ldots + \int_{s_i}^{s_{i+1}} (M + m_i - b(s - s_i)) ds + \ldots +$$

$$\int_{s_{n-1}}^{s_n} (M + m_{n-1} - b(s - s_{n-1})) ds = \int_0^{s_n} M ds + \int_0^{s_1} m_0 ds +$$

$$\int_{s_1}^{s_2} m_1 ds + \ldots + \int_{s_{n-1}}^{s_n} m_{n-1} ds + \int_0^{s_n} (-bs) ds + \ldots +$$

$$\int_{s_1}^{s_2} bs_1 ds + \ldots + \int_{s_i}^{s_{i+1}} bs_i ds + \ldots + \int_{s_{n-1}}^{s_n} bs_{n-1} ds$$

$\Rightarrow \min(m_0 s_1 + m_1(s_2 - s_1) + \ldots + m_{n-1}(s_n - s_{n-1}) +$ $bs_1(s_2 - s_1) + \ldots + bs_{n-1}(s_n - s_{n-1}))$ Hopefully, the weight at the refueling location is just $M$. In other words, the refueling gas is totally burned out when the next refueling occurs.

$$s_1 = \frac{m_0}{b}, s_2 = \frac{m_0 + m_1}{b}, \ldots, s_n = \frac{m_0 + \ldots + m_{n-1}}{b}$$

$\Rightarrow$ $\min(m_0^2 + m_1^2 + \ldots + m_{n-1}^2 + m_0 m_1 + m_0 m_2 + m_1 m_2 + \ldots + m_{n-2} m_{n-1})$ $\Rightarrow m_0 = m_1 = \ldots = m_{n-1}$, under the condition that $m_0 + m_1 + \ldots + m_{n-1} = bs_n$ When $n = 2$, $m_0^2 + m_1^2 + m_0 m_1 = m_0^2 + (bs_n - m_0)^2 + m_0(bs_n - m_0) =$ $m_0^2 - bs_n m_0 + (bs_n)^2$ When $m_0 = m_1$, it reaches its minimum To extend, when $m_0 = m_1 = \ldots = m_{n-1}$, the fuel consumption reaches the minimum In accordance with one or more embodiments, the invention is then able to determine an optimal refueling strategy for the vehicle.

FIG. 4 depicts a block diagram of sensed data and communication of sensed data with the vehicle using a system and method in accordance with the present invention, in accordance with one or more embodiments. From FIG. 4, it is envisioned that a system and method in accordance with the present invention may also receive local and remote sensed data that it may then use as additional parameters and characteristics to more accurately determine a refueling strategy. A user vehicle is located at 410 which includes a processor for processing the received data in accordance with the predetermined manner of calculation set forth herein. The user also has a receiver with capability for receiving the local or remote information and is able to route the received information for further processing in accordance with one or more embodiments herein. Local sensed data 430 may include, by example, wind and temperature data encountered on a route by the vehicle, at the vehicle. Remote sensed data 440 may include, for example, construction and topographical information received via global positioning satellite (GPS) systems, etc. A traffic camera 450, a form of remote sensed data, may also provide predictive route data. Remote data 440, 450 is communicated to the vehicle though a communication gateway 490 which can receive and process the data for transmission to a service provider 420 associated with the vehicle 410 for receipt of the information. Other remote data 460 may be provided directly to the service provider 420. Once the information is received by the vehicle 410, it may be processed by a system and method in accordance with the present invention and an optimal refueling strategy may then be calculated and provided to the user, preferably in accordance with the predetermined manner.

Figure 5:
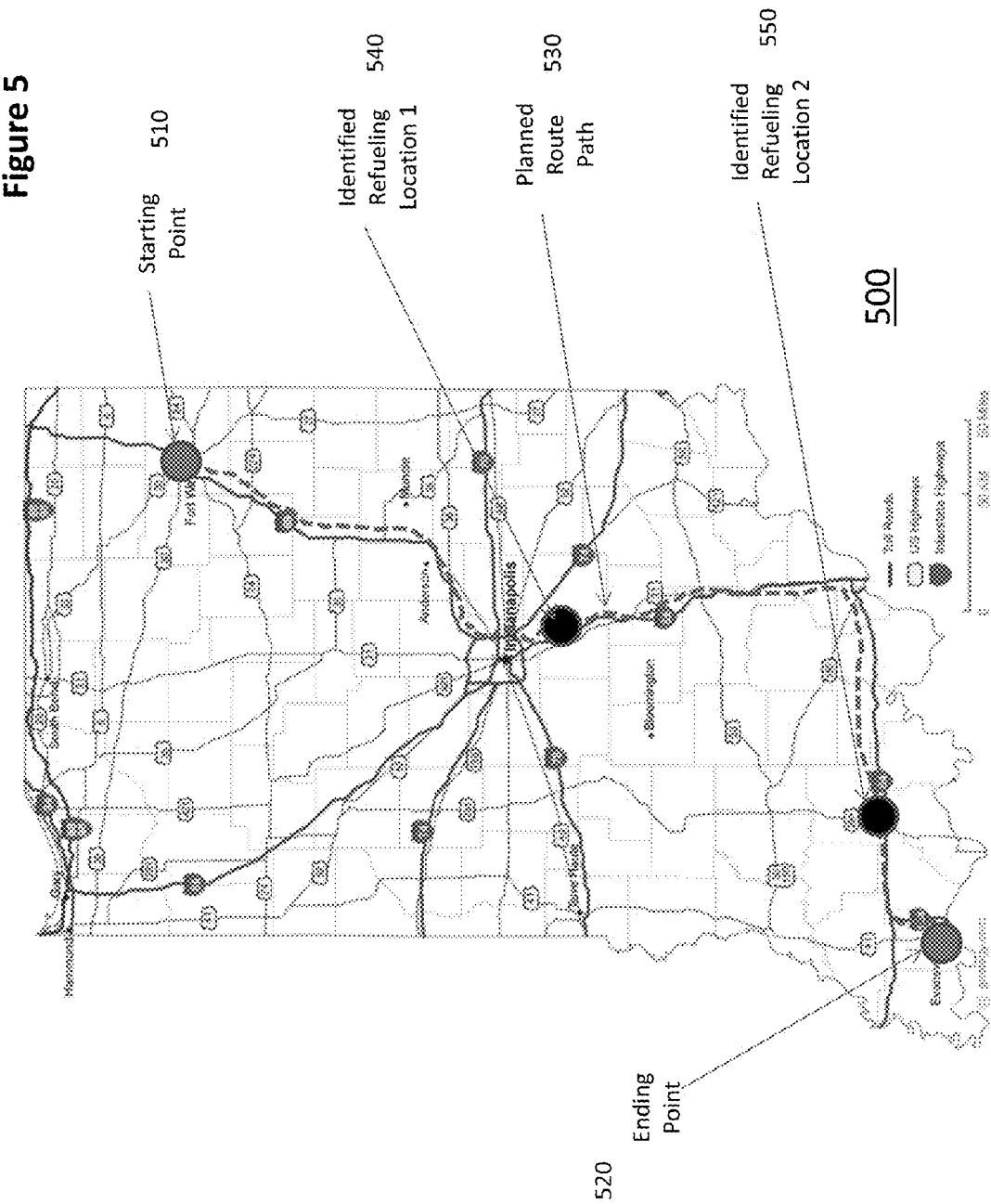
FIG. 5 is a depiction of a refueling strategy for a planned route for a vehicle having a starting point and an ending point, in accordance with an embodiment of the invention.

FIG. 5 is a depiction of a refueling strategy for a planned route 500 for a vehicle having a starting point 510 and an ending point 520, in accordance with an embodiment of the invention. From FIG. 5, two refueling locations are identified at 540 and 550 resulting from using a system and method in accordance with the present invention.

Preferably, the refueling agenda determine for FIG. 5 represents a vehicle having an internal combustion engine which is to begin at an originating starting point 510 and end at a final end point 520. The vehicle may also undertake one or more stops along the way, which are not depicted in the Figure. The vehicle may also include one or more sensors which read the vehicle operational characteristics at a predetermined time and also include a communications system which enable the vehicle to communicate the vehicle operational characteristics, sensor data, environmental characteristics and real-time information associated with the mission across a communications network to a remote location or the vehicle.

In a further exemplar, a vehicle is on a mission to travel from the originating starting point to the final end point. Prior to the mission's initiation, an estimated amount of fuel needed for the mission is determined in relation to vehicle operating parameters, anticipated travel and weather conditions, load and weight of the vehicle, maximum fuel capacity, etc. (including other characteristics). The estimated amount of fuel needed for completion of the mission is "EST-Ftot." Similarly, using a system and method in accordance with the present invention, it is determined from the vehicle operating characteristics that the maximum quantity of fuel available to be placed on board the vehicle cannot exceed the fuel tank capacity, which is determined to be TANK-Fmax. In the present example, EST-Ftot is greater than TANK-Fmax indicating that the vehicle must make one or more stops to refuel in order to complete the mission. A system and method in accordance with the present invention then determines a refueling management solution to distribute the fuel quantity refueling strategy in relation to the operational characteristics and the mission, to provide optimal fuel economy. A system and method in accordance with the present invention in effect determines the energy (E) that is affected by the fuel load management and the number of times needed to refuel (n) in a specific manner.

In one or more embodiments, since air drag is not associated with the weight of the vehicle, load or fuel, the air drag component is preferably removed from consideration. Similarly, in one or more embodiments, it is further recognized that by assuming constant velocity, complete consumption of the fuel as between refueling points, and removing uphill and downhill impacts, the algorithm used as the predetermined manner of calculation can then be further reduced as previously set forth.

Using a system and method in accordance with the present invention, in one or more embodiments where the assumption of zero grade on the route and no adverse effect of traffic, road construction, weather condition, and the like, an average fuel distribution can also be determined to provide an optimal solution. Additionally, a system and method in accordance with the present invention may also include user preferences which may add further parameters or otherwise impact the operational and vehicle characteristics, such as route factors, for instance.

Figure 6:
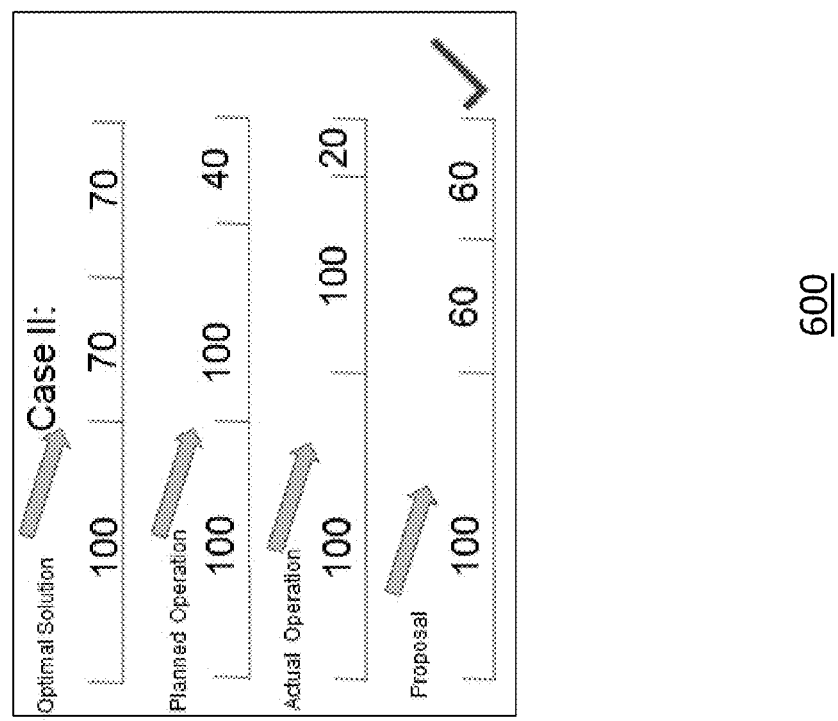
FIG. 6 sets forth a representative output of an optimal refueling solution including identified amounts to be refueled at targeted refueling locations using a system and method in accordance with the present invention, in accordance with one or more embodiments; and, FIG. 7 sets forth a representative output of an optimal refueling solution having improved refueling times using a system and method in accordance with the present invention, accordance with one or more embodiments.

FIG. 6 sets forth a representative output of an optimal refueling solution 600 including identified amounts to be refueled at targeted refueling locations using a system and method in accordance with the present invention, in accordance with one or more embodiments. From FIG. 6, the amount of fuel quantity to refuel with (i.e. amount) for each refueling location is set forth for a particular situation, where comparatively, the optimal solution is compared to an original planned solution, the actual operation activity and to a proposed solution. For FIG. 6, a system and method in accordance with the present invention's proposed solution as the optimal solution using a system and method in accordance with the present invention in association with the specific parameters and characteristics associated with the case.

For example, FIG. 6 sets forth a representative output 600 of an optimal refueling solution having improved fuel economy using a system and method in accordance with the present invention. From FIG. 6, the Optimal Solution is [100 70 70] where the total anticipated fuel required is 240 units. From the Figure, the assumption includes no buffer in the determination, however it will be appreciated that a system and method in accordance with the present invention provides for a fuel quantity buffer in one or more embodiments as well and let the Buffer to be zero at this point. The initial fuel in the vehicle is determined to be 100 units with two sequences of refueling involving 70 units each, at prescribed destinations.

From FIG. 6, the planned solution is presented which is determined by a system and method in accordance with the present invention and includes an allowance for a buffer in the amount of fuel consumed. In operation then, the fuel buffer does not require the vehicle to run to approximately empty before refueling. In operation, a planned solution, in this example, will still require two refuelings however the location of those refueling locations will be different than in the optimal solution. The initial fueling comprises 100 units, with a refueling of 100 units at a first refueling location and a second refueling of 40 units at a second refueling location.

From FIG. 6, the actual operation is presented which is determined by a system and method in accordance with the present invention after receiving and calculating operational characteristics in relation to vehicle characteristics and the planned operation determination. For instance, in one example, there exists a tail wind that has been determined based on operational sensor data (operational characteristic information) that is provided improved fuel economy. Using the active information in association with the planned operation solution, a system and method in accordance with the present invention adds the wind speed determined by the wind sensor as the input to adjust the final fuel consumption which will affect the refueling amount. A system and method in accordance with the present invention then determines that as a matter of course, the actual operation would have initiated with 100 units of fuel, refueled at a first location with 100 units of fuel, and then refueled at a second location with 20 units of fuel, resulting in a reduced consumption of fuel by 20 units.

Further from FIG. 6, the proposed solution having improved fuel economy is determined by a system and method in accordance with the present invention in relation to the actual operation. To account for the active updates of operational characteristic information, a system and method in accordance with the present invention determines that improved fuel economy can be accomplished by a revised approach as a proposal solution. The proposed solution determines an initial fueling of 100 units, followed by a refueling of 60 units at a first refueling location, and a second refueling of 60 units at a second refueling location.

In one or more preferred embodiments, a system and method in accordance with the present invention provides the vehicle information concerning the amount of fuel quantity to refuel with (i.e. amount) and the location of where the refueling is to occur (i.e., location) in relation to reducing the refueling times required.

Figure 7:
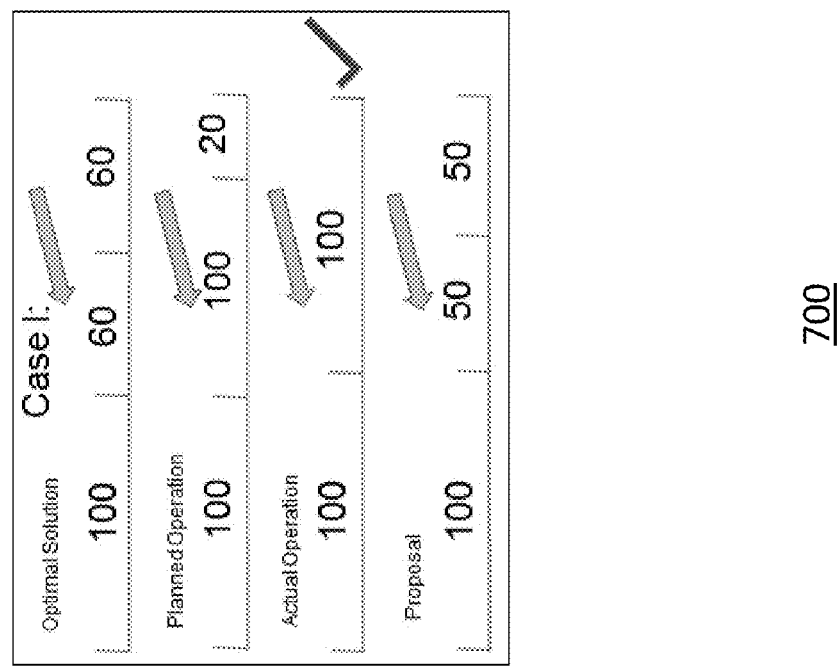

FIG. 7 sets forth a representative output 700 of an optimal refueling solution having improved refueling times using a system and method in accordance with the present invention. From FIG. 7, the Optimal Solution is [100 60 60] where the total anticipated fuel required is 240 units. The assumption includes no buffer in the determination, however it will be appreciated that a system and method in accordance with the present invention provides for a fuel quantity buffer in one or more embodiments as well. And let the Buffer to be zero at this point. The initial fuel in the vehicle is determined to be 100 units with two sequences of refueling involving 60 units each, at prescribed destinations.

From FIG. 7, a planned solution is presented which is determined by a system and method in accordance with the present invention and includes an allowance for a buffer in the amount of fuel consumed. In operation then, the fuel buffer does not require the vehicle to run to approximately empty before refueling. In operation, a planned solution, in this example, will still require two refuelings however the location of those refueling locations will be different than in the optimal solution. The initial fueling comprises 100 units, with a refueling of 100 units at a first refueling location and a second refueling of 20 units at a second refueling location.

Further from FIG. 7, an actual operation is presented which is determined by a system and method in accordance with the present invention after receiving and calculating operational characteristics in relation to vehicle characteristics and the planned operation determination. For instance, in one example, there exists improved weather conditions over those anticipated based on operational sensor data (operational characteristic information) providing better fuel economy by 20 units of fuel. Using the active information in association with the planned operation solution, a system and method in accordance with the present invention determines that as a matter of course, the actual operation would have initiated with 100 units of fuel and then refueled at a first location with 100 units of fuel.

Additionally from FIG. 7, a proposed solution having improved fuel economy is determined by a system and method in accordance with the present invention in relation to the actual operation. To account for the active updates of operational characteristic information, a system and method in accordance with the present invention determines that improved fuel economy can be accomplished by a revised approach as a proposal solution. The proposed solution determines an initial fueling of 100 units, followed by a refueling of 50 units at a first refueling location, and a second refueling of 50 units at a second refueling location. However, as the condition of operational optimization is to improve refueling timing over fuel economy, the proposed solution is not selected by a system and method in accordance with the present invention as the desired approach. Rather a system and method in accordance with the present invention chooses the actual operation as the preferred approach as it results in one less refueling stop (reduced time) and already account for an improvement in fuel economy due to improved weather conditions.

Similarly, in other embodiments, improvements to operational characteristics may be accounted for by a system and method in accordance with the present invention by adjusting the buffer on fuel consumption in accordance with the improvement. For instance, where traffic and road construction expectations are improved on as determined by real-time sensor data, a system and method in accordance with the present invention can account for this improvement on the fuel consumption by adding or transferring an improved traffic effect as an additional buffer quantity added to the refueling amount. Conversely, where the expectations of operational performances in relation to operational characteristics are determined to be less than desired, the increase on the fuel consumption will be accounted for by subtracting or transferring a degraded traffic effect as an additional buffer quantity subtracted from the refueling amount.

It will be appreciated that a system and method in accordance with the present invention may provide adjustments to the fuel consumption, as an impact to fuel economy, for improvements and hindrances regarding operational characteristics, vehicle characteristics, and user preferences. For example, reduced air pressure in one or more tires or unanticipated added load can be accounted for using a system and method in accordance with the present invention. By further example, unanticipated terrain impacts may be accounted for using a system and method in accordance with the present invention.

It will be further appreciated that a system and method in accordance with the present invention also learns from active data received from the sensors resident on the vehicle as well as information gathered through the network, such that adjustments to the fuel consumption and refueling timing, as an impact to fuel economy, may be included. For example, a system and method in accordance with the present invention will adjust its reference to the operation of the vehicle based on current information in one or more embodiments.

What is claimed is:

1. A method for remotely providing refueling management instructions for a vehicle comprising the steps of:
   determining one or more initial vehicle parameters including an initial quantity of fuel, a plurality of route parameters including a starting point, an ending point and an estimated average fuel efficiency of the vehicle, and a plurality of refueling parameters including one or more refueling locations;
   calculating that the initial quantity of fuel is insufficient in relation to the estimated average fuel efficiency and a distance to be traveled by the vehicle equal to a difference between the ending point and the starting point;
   receiving one or more current vehicle parameters at a first predetermined time; and
   calculating a refueling agenda including identifying one or more refueling locations and an associated predetermined refueling amount at each of the identified one or more refueling locations, to provide optimal fuel economy for the vehicle arriving at the ending point.

2. The method of claim 1, wherein the one or more initial vehicle parameters includes one or more of the initial quantity of fuel, fuel tank capacity, minimum fuel capacity, mass of load, mass of vehicle, mass of personnel associated with vehicle, engine parameters and performance, engine fueling map and average estimated fuel economy.

3. The method of claim 1, wherein the plurality of route parameters includes two or more of the starting point, the ending point, the estimated average fuel efficiency of the vehicle determined in relation to the average estimated fuel economy over a route, route efficiency factor as between two predetermined points on a planned route path, topography details, the planned route path between the starting point and the ending point, one or more alternate route paths, traffic conditions, weather conditions, construction details, wind information, and sensed data from one or more sensors resident on the vehicle or from one or more remote sensors in communication with the vehicle.

4. The method of claim 1, wherein the plurality of refueling parameters includes two or more of: refueling locations, type of refueling location, distance between refueling locations, refueling history of vehicle and preferred refueling conditions.

5. The method of claim 1, wherein the one or more current vehicle parameters as of a current point in time includes one or more of vehicle location, quantity of fuel remaining, remaining capacity for fuel for vehicle, travel time since start, remaining travel time to end, estimated time to minimum fuel capacity, estimated miles to minimum fuel capacity, average vehicle speed, average engine performance, and estimated time of arrival (ETA).

6. The method of claim 1, wherein calculating the estimated average fuel efficiency is calculated as the estimated average fuel economy multiplied by a route efficiency factor in relation to the planned route path defined as between two predetermined points along the planned route path.

7. The method of claim 1, wherein calculating the refueling agenda includes identifying a plurality of refueling locations and an associated predetermined refueling amount at each of the identified plurality of refueling locations, thereby providing an optimal refueling strategy for the vehicle in relation to the planned route path.

8. The method of claim 7, wherein the calculation relates the location of the vehicle at a first predetermined time (S), with an $i^{th}$ refueling location ($S_i$), mass of vehicle, freight and driver (M), fuel quantity at $i^{th}$ refueling ($m_i$), time spent at $i^{th}$ refueling location ($c_i(m_i, s)$), minimum fuel quantity in tank (m), sacrificed time limit ($\check{T}$), and times to refuel (n), where $m_i > m$ and $T <= \check{T}$ in accordance with:

$$t = \sum_{i=1}^{i=n} c_i \text{ and}$$

$$\min \int m(s)ds =$$

$$\int_0^{s_1} (M + m_0 - bs)\,ds + \int_{s_1}^{s_2} (M + m_1 - b(s-s_1))\,ds + \ldots +$$

$$\int_{s_i}^{s_{i+1}} (M + m_i - b(s-s_i))\,ds + \ldots +$$

$$\int_{s_{n-1}}^{s_n} (M + m_{n-1} - b(s-s_{n-1}))\,ds = \int_0^{s_n} M\,ds + \int_0^{s_1} m_0\,ds +$$

$$\int_{s_1}^{s_2} m_1\,ds + \ldots + \int_{s_{n-1}}^{s_n} m_{n-1}\,ds + \int_0^{s_n} (-bs)\,ds + \ldots +$$

$$\int_{s_1}^{s_2} bs_1\,ds + \ldots + \int_{s_i}^{s_{i+1}} bs_i\,ds + \ldots + \int_{s_{n-1}}^{s_n} bs_{n-1}\,ds$$

9. The method of claim 8, wherein a distributed fuel quantity is determined for one or more refueling locations along the planed route path for the vehicle in which refueling times and refueling amounts, per refueling stops, are reduced.

10. A calculation system for determining an optimal refueling route for a vehicle requiring one or more refueling activities, comprising steps of:
  identifying one or more initial vehicle parameters including an initial quantity of fuel, a plurality of route parameters including a starting point, an ending point and an estimated average fuel efficiency of the vehicle, and a plurality of refueling parameters including one or more refueling locations;
  receiving one or more sensed current vehicle parameters at a first predetermined time in relation to a first route location being a determinable distance from the end point; and
  providing in response to determinative calculations, refueling instructions including a refueling agenda identifying one or more refueling locations and an associated predetermined refueling amount at each of the one or more identified refueling locations.

11. The system of claim 10 in which the determinative calculations include associating a location of the vehicle at a first predetermined time (S), with an $i^{th}$ refueling location ($S_i$), mass of vehicle, freight and driver (M), fuel quantity at $i^{th}$ refueling ($m_i$), time spent at $i^{th}$ refueling location ($c_i(m_i, s)$), minimum fuel quantity in tank (m), sacrificed time limit ($\check{T}$), and times to refuel (n), where $m_i > m$ and $T <= \check{T}$ in accordance with:

$$t = \sum_{i=1}^{i=n} c_i \text{ and}$$

$$\min \int m(s)ds =$$

$$\int_0^{s_1} (M + m_0 - bs)\,ds + \int_{s_1}^{s_2} (M + m_1 - b(s-s_1))\,ds + \ldots +$$

$$\int_{s_i}^{s_{i+1}} (M + m_i - b(s-s_i))\,ds + \ldots +$$

$$\int_{s_{n-1}}^{s_n} (M + m_{n-1} - b(s-s_{n-1}))\,ds = \int_0^{s_n} M\,ds + \int_0^{s_1} m_0\,ds +$$

$$\int_{s_1}^{s_2} m_1\,ds + \ldots + \int_{s_{n-1}}^{s_n} m_{n-1}\,ds + \int_0^{s_n} (-bs)\,ds + \ldots +$$

$$\int_{s_1}^{s_2} bs_1\,ds + \ldots + \int_{s_i}^{s_{i+1}} bs_i\,ds + \ldots + \int_{s_{n-1}}^{s_n} bs_{n-1}\,ds$$

12. The system of claim 11, wherein the refueling instructions provided include a plurality of refueling locations and a specific refueling amount for each refueling location.

13. The system of claim 11, wherein the optimal refueling route for the vehicle is determined in relation to a planned route and a plurality of initial vehicle parameters, route parameters, refueling parameters, sensed current vehicle parameters and one or more route factors.

14. The system of claim 13, wherein the one or more route factors include a predetermined sacrificed time limit ($\check{T}$), minimum fuel quantity in tank (m), and a fuel consumed coefficient (b).

15. The system of claim 13, wherein the sensed current vehicle parameters includes one or more of data received from one or more sensors resident on the vehicle or from one or more remote sensors in communication with the vehicle.

16. The system of claim 15, wherein the route parameters further include one or more of data received from one or more sensors having traffic, weather and construction information received from sensors resident on the vehicle or from one or more remote sensors in communication with the vehicle.

17. The system of claim 13, wherein the instructions are provided by electronic communication to the vehicle.

18. A non-transitory computer readable medium containing program instructions for determining an optimal refueling route for a vehicle requiring one or more refueling activities, which program instructions, upon being executed by a processor, instruct the processor to perform:
  identifying one or more initial vehicle parameters including an initial quantity of fuel, a plurality of route parameters including a starting point, an ending point and an estimated average fuel efficiency of the vehicle, and a plurality of refueling parameters including one or more refueling locations;

receiving one or more current vehicle parameters at a first predetermined time in relation to a first route location; and generating in response to predetermined calculations, refueling instructions including a refueling agenda identifying one or more refueling locations and an associated predetermined refueling amount at each of the one or more identified refueling locations.

19. The non-transitory computer readable medium of claim 18, wherein the refueling instructions comprise one or more of a visual, electronic or audible instruction.

20. The non-transitory computer readable medium of claim 18, wherein the predetermined calculations include associating a location of the vehicle at a first predetermined time (S), with an $i^{th}$ refueling location ($S_i$), mass of vehicle, freight and driver (M), fuel quantity at refueling ($m_i$), time spent at refueling location ($c_i$ ($m_i$, s)), minimum fuel quantity in tank (m), sacrificed time limit ($\breve{T}$), and times to refuel (n), where $m_i$>m and T<=$\breve{T}$ in accordance with:

$$t = \sum_{i=1}^{i=n} c_i \text{ and}$$

$$\min \int m(s)ds = \int_0^{s_1}(M + m_0 - bs)ds + \int_{s_1}^{s_2}(M + m_1 - b(s-s_1))ds + \ldots + \int_{s_i}^{s_{i+1}}(M + m_i - b(s-s_i))ds + \ldots + \int_{s_{n-1}}^{s_n}(M + m_{n-1} - b(s-s_{n-1}))ds = \int_0^{s_n} M ds + \int_0^{s_1} m_0 ds + \int_{s_1}^{s_2} m_1 ds + \ldots + \int_{s_{n-1}}^{s_n} m_{n-1} ds + \int_0^{s_n}(-bs)ds + \ldots + \int_{s_1}^{s_2} bs_1 ds + \ldots + \int_{s_i}^{s_{i+1}} bs_i ds + \ldots + \int_{s_{n-1}}^{s_n} bs_{n-1} ds$$

wherein the refueling instructions provided include a plurality of refueling locations and a specific refueling amount for each refueling location.

\* \* \* \* \*